(12) United States Patent
Hess (10) Patent No.: US 8,977,626 B2
(45) Date of Patent: Mar. 10, 2015

(54) INDEXING AND SEARCHING A DATA COLLECTION

(71) Applicant: Apple Inc., Cupertino, CA (US)

(72) Inventor: Jonathan J. Hess, Los Altos, CA (US)

(73) Assignee: Apple Inc., Cupertino, CA (US)

(*) Notice: Subject to any disclaimer, the term of this patent is extended or adjusted under 35 U.S.C. 154(b) by 144 days.

(21) Appl. No.: 13/691,603

(22) Filed: Nov. 30, 2012

(65) Prior Publication Data

US 2014/0025684 A1     Jan. 23, 2014

Related U.S. Application Data

(60) Provisional application No. 61/674,269, filed on Jul. 20, 2012.

(51) Int. Cl.
   *G06F 17/30*     (2006.01)

(52) U.S. Cl.
   CPC .... *G06F 17/30699* (2013.01); *G06F 17/30613* (2013.01); *G06F 17/30657* (2013.01)
   USPC .......................................... 707/741; 707/754

(58) Field of Classification Search
   CPC .................... G06F 17/30867; G06F 17/30864; G06F 17/30902
   USPC ................................................. 707/741, 754
   See application file for complete search history.

(56) References Cited

U.S. PATENT DOCUMENTS

| 7,636,703 | B2 | 12/2009 | Taylor | |
|---|---|---|---|---|
| 7,702,683 | B1* | 4/2010 | Kirshenbaum | 707/758 |
| 7,743,013 | B2* | 6/2010 | Mityagin et al. | 707/999.1 |
| 8,560,558 | B2* | 10/2013 | Watanabe et al. | 707/756 |
| 2006/0294311 | A1* | 12/2006 | Fu et al. | 707/100 |
| 2011/0208711 | A1* | 8/2011 | Van Vleet et al. | 707/706 |
| 2011/0231446 | A1 | 9/2011 | Buhler et al. | |
| 2012/0136846 | A1* | 5/2012 | Song et al. | 707/698 |
| 2013/0166576 | A1* | 6/2013 | Hudzia et al. | 707/754 |
| 2013/0326154 | A1* | 12/2013 | Haswell | 711/141 |
| 2014/0013052 | A1* | 1/2014 | Sawin et al. | 711/122 |
| 2014/0108375 | A1* | 4/2014 | Hendry | 707/706 |

OTHER PUBLICATIONS

"Longest Prefix Matching Using Bloom Filters," by Dharmapurikar, Krishnamurthy and Taylor, *Member, IEEE*, in *IEEE/ACM Transactions on Networking*, vol. 14, No. 2, Apr. 2006, 13 pages.

"New Techniques for Private Stream Searching," by Bethencourt and Song (Carnegie Mellon University) and Waters (SRI International), from *ACM Transactions on Information and System Security*, vol. 12, No. 3, Article 16, Jan. 2009, 32 pages.

(Continued)

*Primary Examiner* — Wilson Lee
*Assistant Examiner* — Tiffany Thuy Bui
(74) *Attorney, Agent, or Firm* — Blakely, Sokoloff, Taylor & Zafman LLP (57) ABSTRACT

A system searches a data collection using a bloom filter index to reduce the search scope to improve search efficiency, while at the same time allowing more flexible searches of the data collection using search terms containing any arbitrary string of data.

11 Claims, 6 Drawing Sheets

(56) References Cited

OTHER PUBLICATIONS

"Efficient Randomized Pattern-matching Algorithms," by Karp and Rabin, from *IBM Journal of Research and Development*, vol. 31, No. 2, Mar. 1987, 12 pages.

"Exact Pattern Matching with Feed-Forward Bloom Filters," by Moraru and Andersen, from the 2011 Proceedings of the Thirteenth Workshop on Algorithm Engineering and Experiments (ALENEX) sponsored by the Society for Industrial and Applied Mathematics, 2011, 12 pages.

\* cited by examiner

INDEXING AND SEARCHING A DATA COLLECTION

CROSS-REFERENCE TO RELATED APPLICATIONS

This application claims the benefit of an earlier filed provisional application, Application Ser. No. 61/674,269, entitled INDEXING AND SEARCHING A DATA COLLECTION filed on Jul. 20, 2012.

BACKGROUND

Searching the content of large collections of documents or other types of files typically involves indexing the documents for later retrieval using a program such as the Finder program which operates on Macintosh computers from Apple Computer, Inc. of Cupertino, Calif. Indexing the documents is usually accomplished through the generation of an inverted index. For example, an inverted index might contain a list of references to documents in which a particular word appears. The inverted index allows a user to search and retrieve documents quickly.

However, given the large numbers of words and documents in which the words can appear, an inverted index can be extremely large. The size of an index presents many challenges in processing and storing the index, such as using the index to perform a search and updating the index when the content of documents change or when new documents are created and old documents deleted. For example, an inverted index can be implemented as a table of all referenced words, and for each word, a list of all documents that contain the word. When a document that has already been indexed changes, the search system must either delete all of the old invalid references and add the new references, or have some mechanism for quickly recognizing and ignoring stale references in future scans and implement a feature to prune them out in the future when the database is bloated.

Moreover, searching an inverted index is typically limited to searching for the words that were used to generate the inverted index.

SUMMARY OF THE DESCRIPTION

Methods, machine readable tangible storage media, and data processing systems enable searching a collection of data using a bloom filter index.

In one embodiment, searching the collection of data begins with filtering out those items in the collection that are determined not to contain a search term using an index whose primary component is a bloom filter generated for each item in the collection of data. Searching the collection of data concludes with a determinative search of the remaining items in the collection of data for items containing the search term.

Because the bloom filter advantageously operates to filter out a significant number of items from the collection of data, the determinative search of the remaining items in the collection is performed quickly. A bloom filter index further enables the user to search for an arbitrary string of characters in the data collection, and not just whole words or phrases. In addition, the bloom filter index is easily updated when items are modified, added or deleted from the collection without impacting the entire index.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Methods and apparatuses for enabling searching a collection of data using a bloom filter index are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g. circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

Unlike other indexing techniques, embodiments of the present invention enable searching a collection of data quickly and efficiently using an index consisting primarily of a bloom filter. Aside from performance advantages, a bloom filter index allows a user to search for any arbitrary string of data in the data collection, and not just whole words or phrases. Being able to search for an arbitrary string of data is particularly helpful for searching collections of source code, but can also be helpful in other contexts as well, such as searching books or other collections of data.

Instead of focusing on identifying an exact location of a search term in a collection of data, embodiments of the present invention operate to reduce the scope of the search by eliminating the vast majority of items that are determined not to match the search term through the use of the bloom filter index. After the majority of items are eliminated, the search concludes with a determinative search of the remaining items to identify the exact location(s) of the search term in an item and to retrieve the items in which the search term occurs. The determinative search is typically performed using a conventional search technique, such as a linear search.

In one embodiment, using the bloom filter index to reduce the scope of the search by eliminating the vast majority of items that are determined not to contain data that can provide a match of the search term can be performed efficiently not only because applying the filter requires very little processing time, but also because the bloom filter index uses a very small amount of memory relative to the collection of data being indexed. For example, in a typical embodiment, the bloom filter index requires approximately 15% of the amount of memory used for the collection of data that is being indexed. Thus, to index a 100 MB data collection would generate an approximately 15 MB bloom filter index. Further, the amount of memory the bloom filter index uses can be arbitrarily increased to reduce the number of false positives, or arbitrarily decreased to reduce the overhead at the cost of increasing the number of false positives.

In addition, because the number of remaining items that survive the application of the bloom filter is small, the determinative search can be performed quickly as well. For example, in a typical usage for a 10,000 document collection when filtering for a search term that only appears in 10 documents, the bloom filter can be expected to eliminate approximately 9,970 documents leaving only 30 documents subjected to a conventional linear search, including 20 documents that would be considered false positives. In an alternate embodiment the memory allocated during use of the bloom filter index can be reduced at the cost of increasing false positives, say for example eliminating approximately 9,900 documents leaving as many as 100 documents subjected to a conventional linear search, including 90 documents that would be considered false positives. Either way, the use of the bloom filter index to eliminate documents is so efficient, and the number of remaining documents subjected to a conventional linear search is so small relative to the size of the entire document collection, that searching the collection using embodiments of the present invention improves search performance significantly both in processor time and memory usage.

In one embodiment, the bloom filter index consists of a bloom filter generated for each item in a collection of data. As is known in the art, a bloom filter is a data structure having two primitive operations: inserting an element for a particular value, and interrogating whether the element for the particular value has been inserted. In embodiments of the present invention, instead of whole words, the particular value for which an element is inserted into the bloom filter is a fixed length run of characters appearing in an item. Specifically, each item's bloom filter consists of a set of elements such that every fixed length run of characters appearing in the item has a corresponding element in the set. In this manner, the collection of data can be advantageously filtered to find those items in the collection of data that have a high likelihood of containing a search term based on the absence of a particular value represented in the set of elements of an item's bloom filter. Further the collection of data can be searched for search terms containing an arbitrary substring of data, and not just for a whole word or words.

As an example, if an item in the collection contains the following lines of source code,

```
// File.c
int function(void) {
Return 0;
}
``` then the content of the item would be inserted into the item's bloom filter as the following fixed length runs of 3 characters each:

```
//
/ F
Fi
Fil
ile
le.
e.c
.c
c i
in
int
``` and so forth.

In one embodiment, during operation, the search for a term appearing in the source code, such as (void), would consist of first using the bloom filter index to determine which items do not contain the term by generating filter queries consisting of the fixed length runs of characters appearing in the search term, e.g., '(vo', 'voi', 'oid', and 'id)'. As soon as it is determined that any one of the fixed length runs of characters appearing in the search term is not contained in an item, the item can be eliminated from the search and the filtering can continue with the next item. After filtering is complete, a determinative search can be performed on the remaining items, which may or may not contain the entire search term. In one embodiment the determinative search is a straight linear search using the entire search term.

It should be noted that, although a bloom filter is capable of determining with certainty that a particular value is not contained in an item, the bloom filter cannot determine with certainty whether the particular value is contained in the item. Thus, there will be a certain number of false positives that could allow some items to pass through an item's bloom filter even though they are ultimately determined not to contain the search term from which the particular value was obtained. The number of false positives, however, it typically small in comparison to the number of remaining items as a whole.

Figure 1:
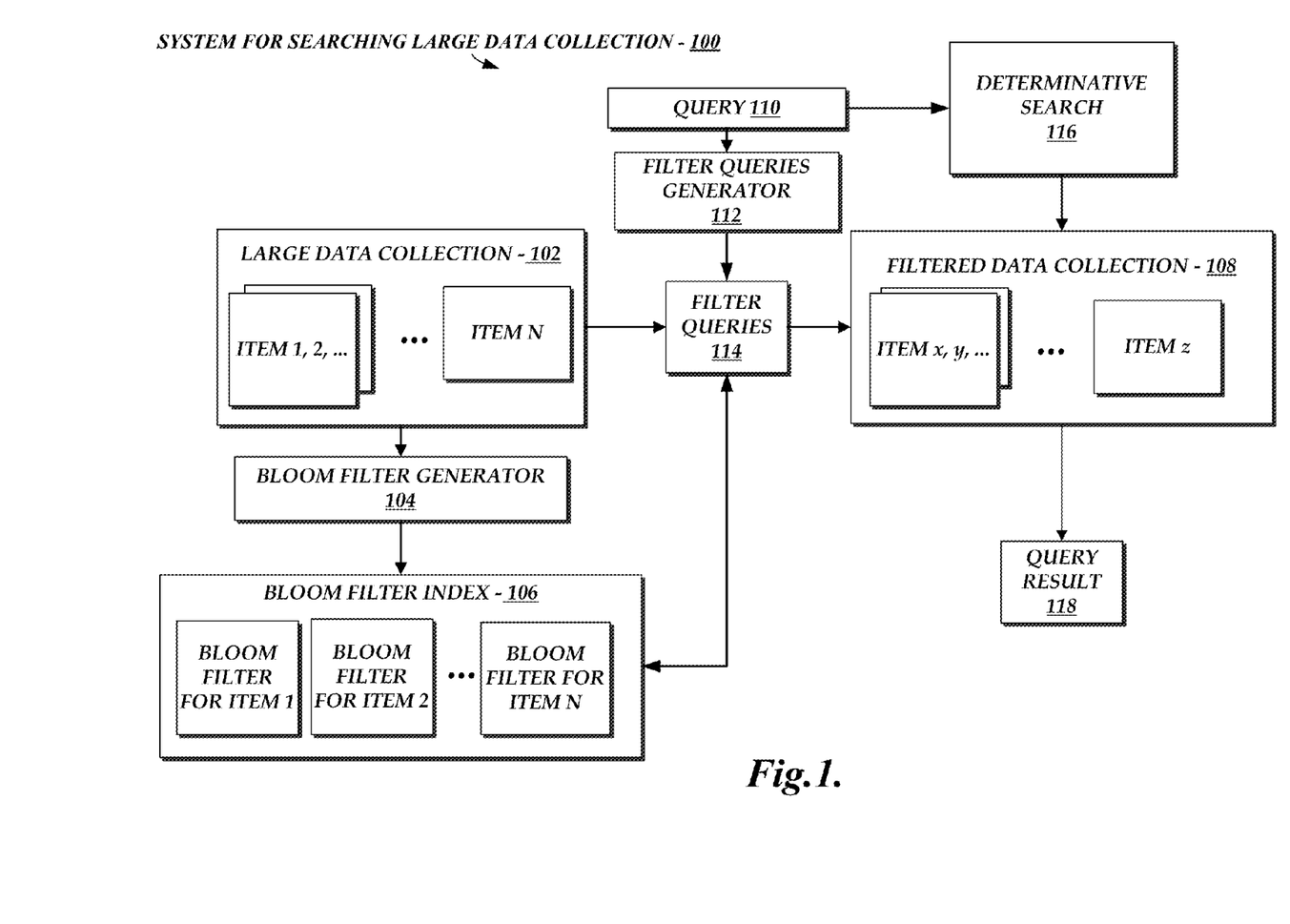
FIG. 1 is a block diagram illustrating exemplary components of a system for searching a large data collection in accordance with an embodiment of the invention.

FIG. 1 is a block diagram illustrating exemplary components of a system 100 for searching a large data collection in accordance with an embodiment of the invention. In the illustrated embodiment, a large data collection 102 contains numerous items, Item 1, 2, . . . N. The items may be documents or other files containing searchable content, metadata, or file management data. For example, the items might include code files in a collection such as a code library, or pages or chapters of text data in a collection such as an electronic book.

In one embodiment, a bloom filter generator 104 is used to generate a bloom filter index 106 consisting of multiple bloom filters, with one bloom filter generated for each item in the large data collection 102. As noted above, among other aspects, each item's bloom filter consists of a set of elements that correspond to every run of fixed length characters appearing in the item. If the item is updated then the bloom filter is simply regenerated. Bloom filters for new items are generated as needed, and bloom filters for deleted items are removed from the bloom filter index as needed.

In one embodiment, a search of the large data collection 102 using the bloom filters 106 is initiated with the receipt of a query 110. A filter queries generator 112 pre-processes the query to generate filter queries 114 based on the content of the query 110 search term. The query 110 search term may be any arbitrary string of data that can be used to search the large data collection 102. Similar to the bloom filter generator 106, the filter queries generator 112 generates filter queries that correspond to every run of fixed length characters appearing in the query 110 search term.

In one embodiment, the filter queries 114 are used in conjunction with the bloom filters 106 to filter the large data collection 102 to produce a filtered data collection 108. The filtered data collection 108 consists of the items remaining after the operation of the bloom filters 106, typically significantly fewer items than are in the large data collection 102. Those remaining items in the filtered data collection 108 are then searched using a determinative search 116 that typically is based on the entire search term that appeared in the original query 110. After application of the determinative search 116 to the filtered data collection 108, a query result 118 is produced that contains the subset of the items in the filtered data collection that actually contain the entire search term or terms that appeared in the original query 110.

Figure 2:
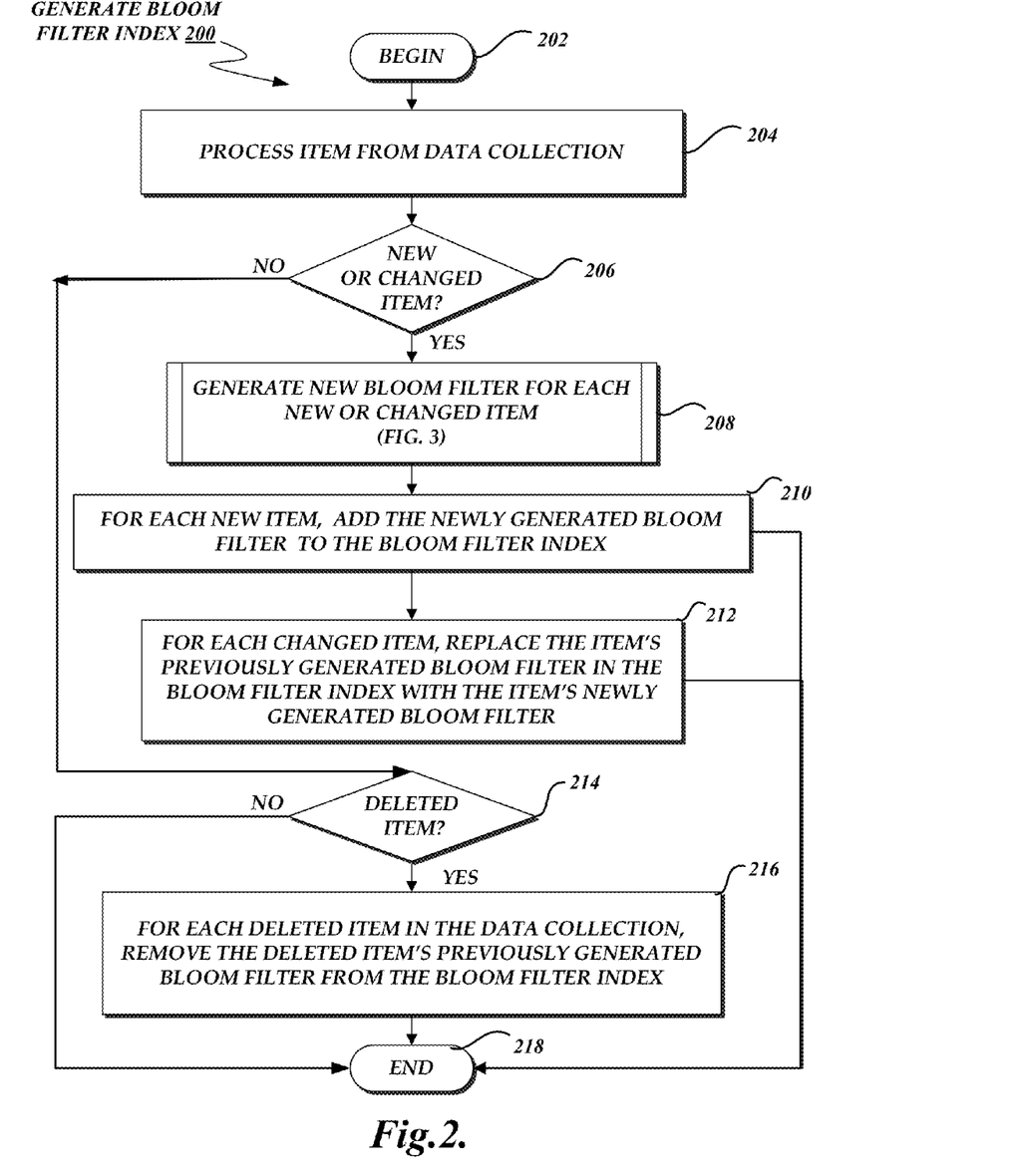
FIGS. 2 through 5 are flow diagrams illustrating certain aspects of a process logic for searching a large data collection in accordance with an embodiment of the invention.

FIGS. 2 through 5 are flow diagrams illustrating certain aspects of a process logic for searching a large data collection in accordance with an embodiment of the invention. In FIG. 2, a process 200 for generating a bloom filter index is illustrated beginning with processing an item from a data collection 204, where the data collection is associated with an existing bloom filter index or for which a bloom filter index is to be generated for the first time.

In a typical embodiment, for data collections 204 having an existing bloom filter index, the only items in the data collection that need be processed are those that are new, changed or deleted since the existing bloom filter index was generated. Thus, the process 200 determines 206 whether that item is new or changed, and if so, generates 208 a bloom filter for the item as will be described in further detail with reference to FIG. 3. The process 200 then adds 210 the newly generated bloom filter to the bloom filter index for new items and replaces 212 a previously generated bloom filter in the bloom filter index with the newly generated bloom filter for changed items.

In one embodiment, the process 200 determines 214 that the item has been deleted from a data collection, in which case the bloom filter for that item is no longer needed in the bloom filter index for that data collection. Thus, the process 200 for generating the bloom filter index simply deletes 216 the item's previously generated bloom filter from the bloom filter index. The process 200 for generating a bloom filter index concludes 218 and is repeated as needed whenever data collections are created or modified, particularly large data collections that benefit from the application of a bloom filter to accelerate and improve the efficiency of subsequent searches of the data collections.

Figure 3:
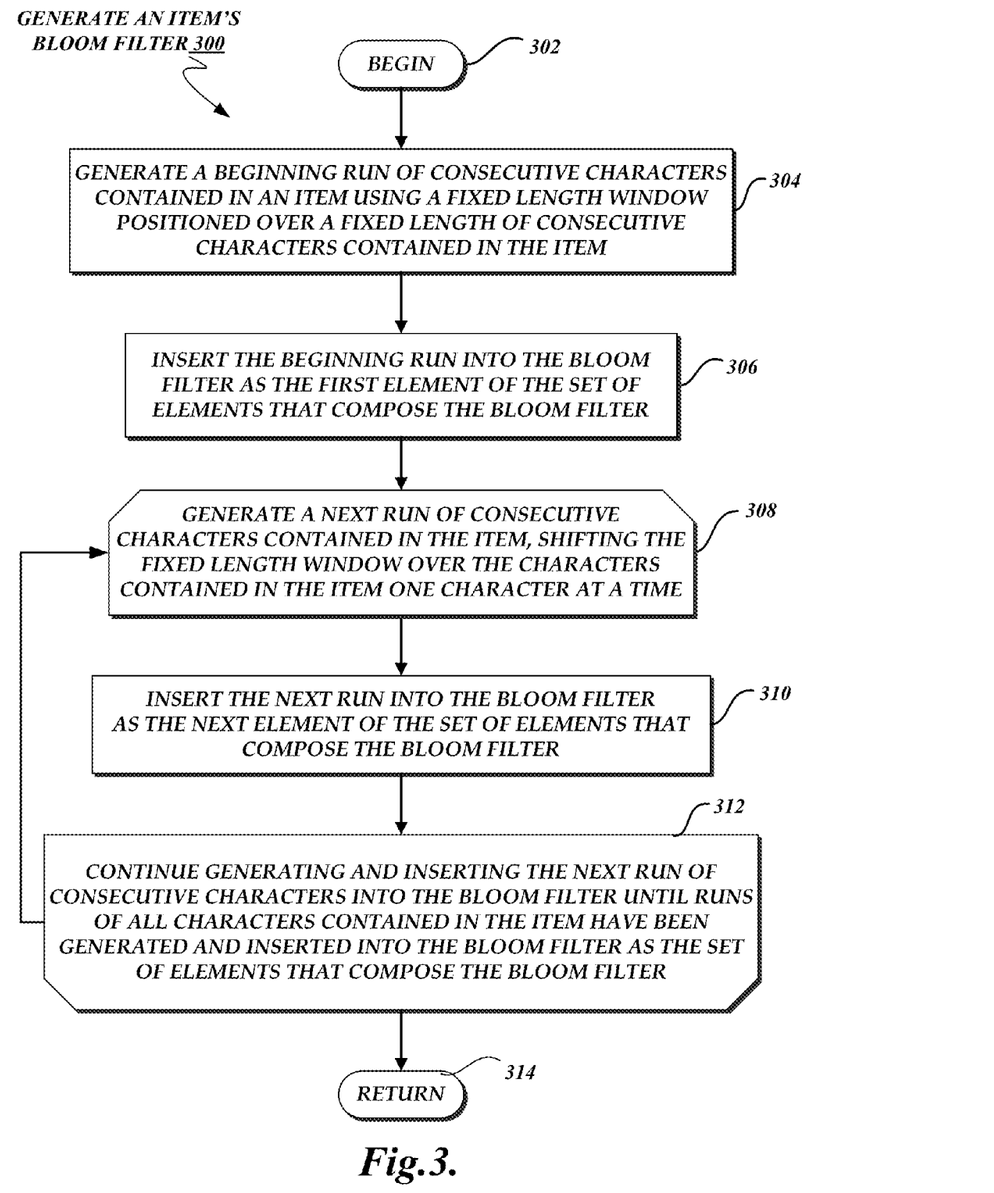

With reference to FIG. 3, in one embodiment a process 300 for generating a bloom filter for an item (from FIG. 2, 208), begins 302 with generating 304 runs of consecutive characters contained in the item, preserving any blank characters. The character runs may be any fixed length, but for most types of data collections, an optimal length is around 3 or 4 characters. For example, for an item containing 100 characters the process 300 would generate 98 runs of characters of 3 characters each.

The runs of characters can be generated using various techniques. For example, with reference to FIG. 3, the character runs are generated 304 using the technique of positioning a fixed length 'window' at a starting position within the characters contained in the item, and then shifting the window over the characters one character at a time to parse each fixed length run of consecutive characters positioned within the window at a given time. The starting position is typically at the beginning of the characters contained in the item, but could also be at the end of the characters contained in the item, and shifting the window over the characters in the reverse order.

For example, in one embodiment, at 304, a beginning fixed length run of consecutive characters is generated after parsing out the first fixed length run of consecutive characters appearing within the window. At 306, the process 300 continues, and the beginning run is inserted into the bloom filter as the first element of the set of elements that compose the bloom filter.

Subsequently, in one embodiment, the process 300 continues with generating the next run of consecutive characters 308, and inserting the next run into the bloom filter as the next element of the set of elements that compose the bloom filter 310, and so on, 312, until runs of all of the characters contained in the item have been generated and inserted into the item's bloom filter, and the process 300 returns control 314 to the process 200 for generating the bloom filter index for the data collection.

Figure 4:
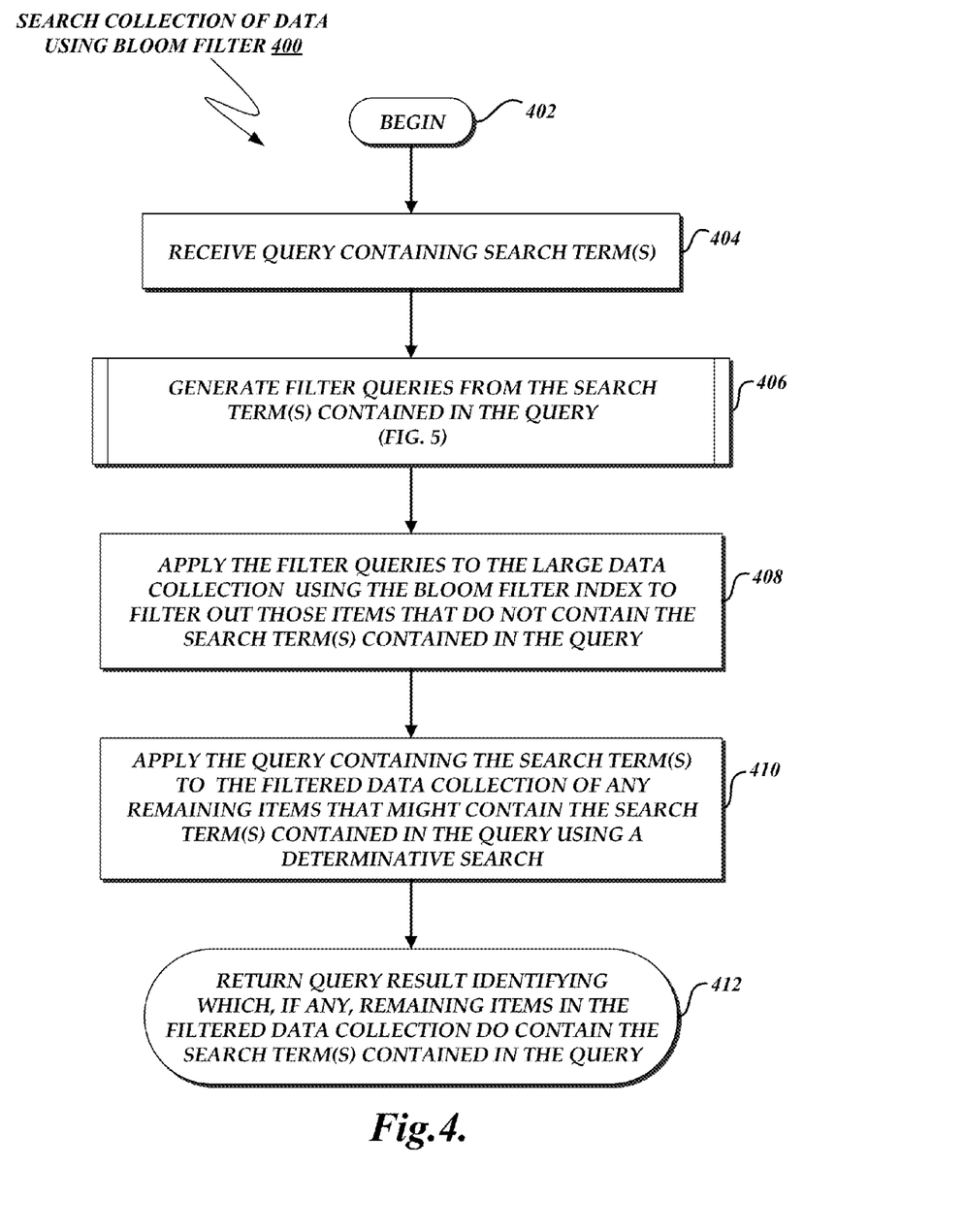

With reference to FIG. 4, in one embodiment a process 400 for searching a collection of data for which a bloom filter index has been generated as described in FIGS. 2-3, begins 402 with receiving 404 a query containing one or more search terms. Before processing the query, however, the process 400 first generates filter queries from the search term(s) contained in the query, where the generated filter queries contain fixed length runs of the characters contained in the search term(s). The process 406 of generating filter queries is similar to the process for generating an item's bloom filter elements, and will be described in greater detail with reference to FIG. 5.

The process 400 continues at process 408 where the generated filter queries are applied to the collection of data using the collection's bloom filter index. By applying the generated filter queries to the collection's bloom filter index, the process 400 is able to filter out those items that do not contain the search term(s) that are contained in the query. For example, if one of the search terms in the query is '(void)' then the generated filter query would contain the fixed length runs of characters '(vo', 'voi', 'oid', and 'id)'. If an item did not contain even one of those fixed length runs as determined in accordance with the elements of the set of elements that make up the bloom filter for that item, then that item can be eliminated from consideration since it could not contain the search term '(void)'.

In one embodiment, the process 400 continues at 410 by applying the original query to the filtered data collection, i.e. the items that remain after eliminating those items from consideration that were determined could not contain the search term based on the bloom filter, where the items that remain might contain the search term(s) contained in the query. The original query is applied to the filtered data collection using any type of determinative search that will definitively identify which items, if any, do contain the search term. Because the filtered data collection contains a relatively small number of items relative to the unfiltered collection of data, the determinative search can usually be completed efficiently, even when using, for example, a straight linear search.

The process 400 concludes at 412, returning a query result identifying which, if any, of the remaining items from the filtered data collection contain the search term(s) contained in the original query.

Figure 5:
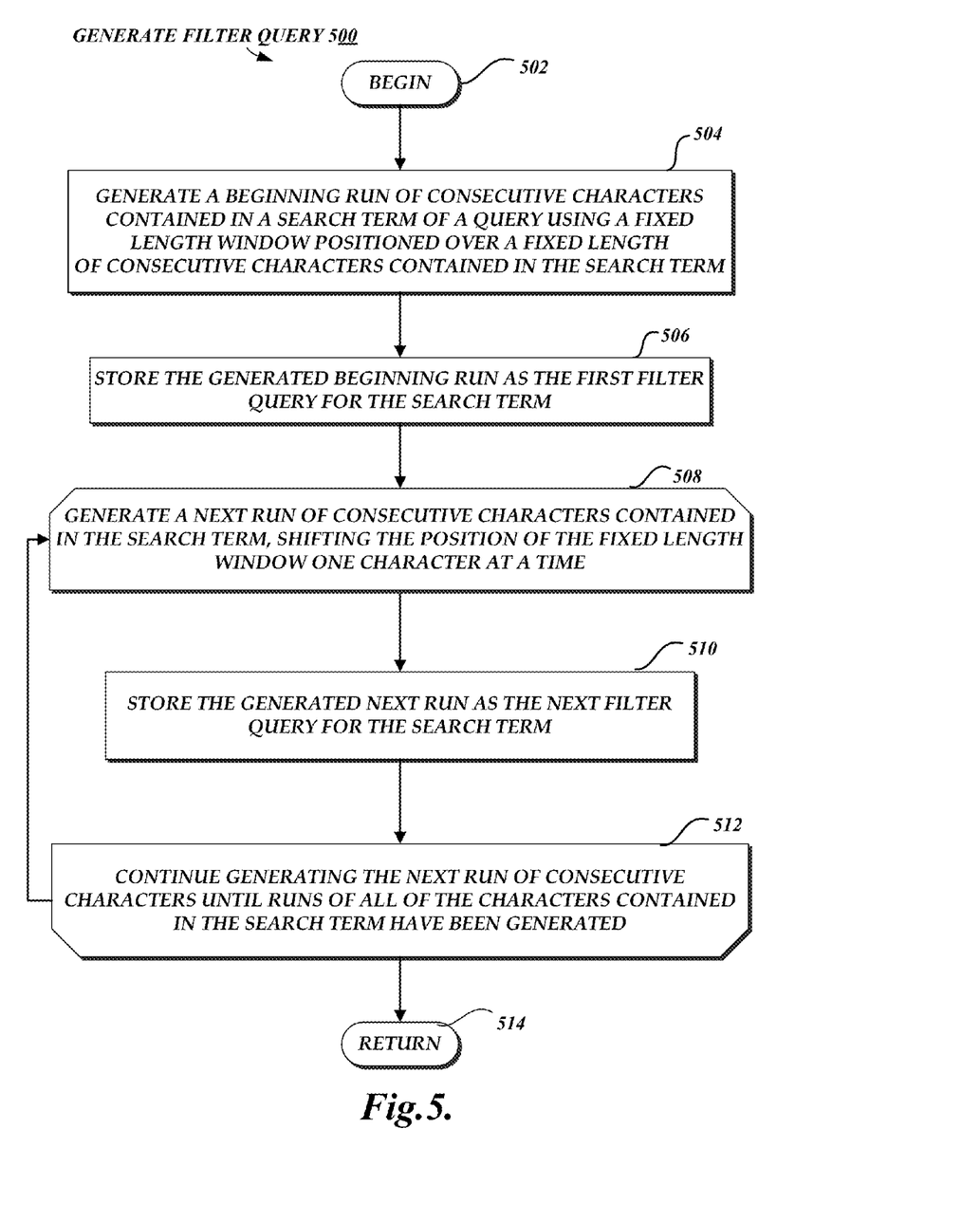

With reference to FIG. 5, in one embodiment a process 500 for generating a filtered query for filtering a collection of data for which a bloom filter index has been generated as described in FIGS. 2-3, begins 502 at process 504, in which for each search term of the query, a beginning run of consecutive characters contained in the search term is generated similarly to the process for generating the first element of a set of elements in a bloom filter, as described with reference to FIG. 3. For example, in one embodiment a fixed length window is positioned over a fixed length of consecutive characters contained in the search term, and the characters delineated by the window are parsed out and stored as the first of a series of filter queries 506 representing the search term(s).

In one embodiment, the process continues at loop 508, in which the next runs of consecutive characters contained in the search term are generated, shifting the position of the search window by one character at a time, storing 510 the next run as the next filter query for the search term, and continuing 512 generating the next runs until all of the characters in the search term have been processed. The resulting generated filter queries are then returned 514 to the calling process 400 (FIG. 4) so that they may be applied to the bloom filter index for filtering out those items that do not contain the search terms of the original query as described with reference to FIG. 4.

Any one of the methods described herein can be implemented on a variety of different data processing devices, including general purpose computer systems, special purpose computer systems, etc. For example, the data processing systems which may use any one of the methods described herein may include a desktop computer or a laptop computer or a tablet computer or a smart phone, or a cellular telephone, or a personal digital assistant (PDA), an embedded electronic device or a consumer electronic device.

Figure 6:
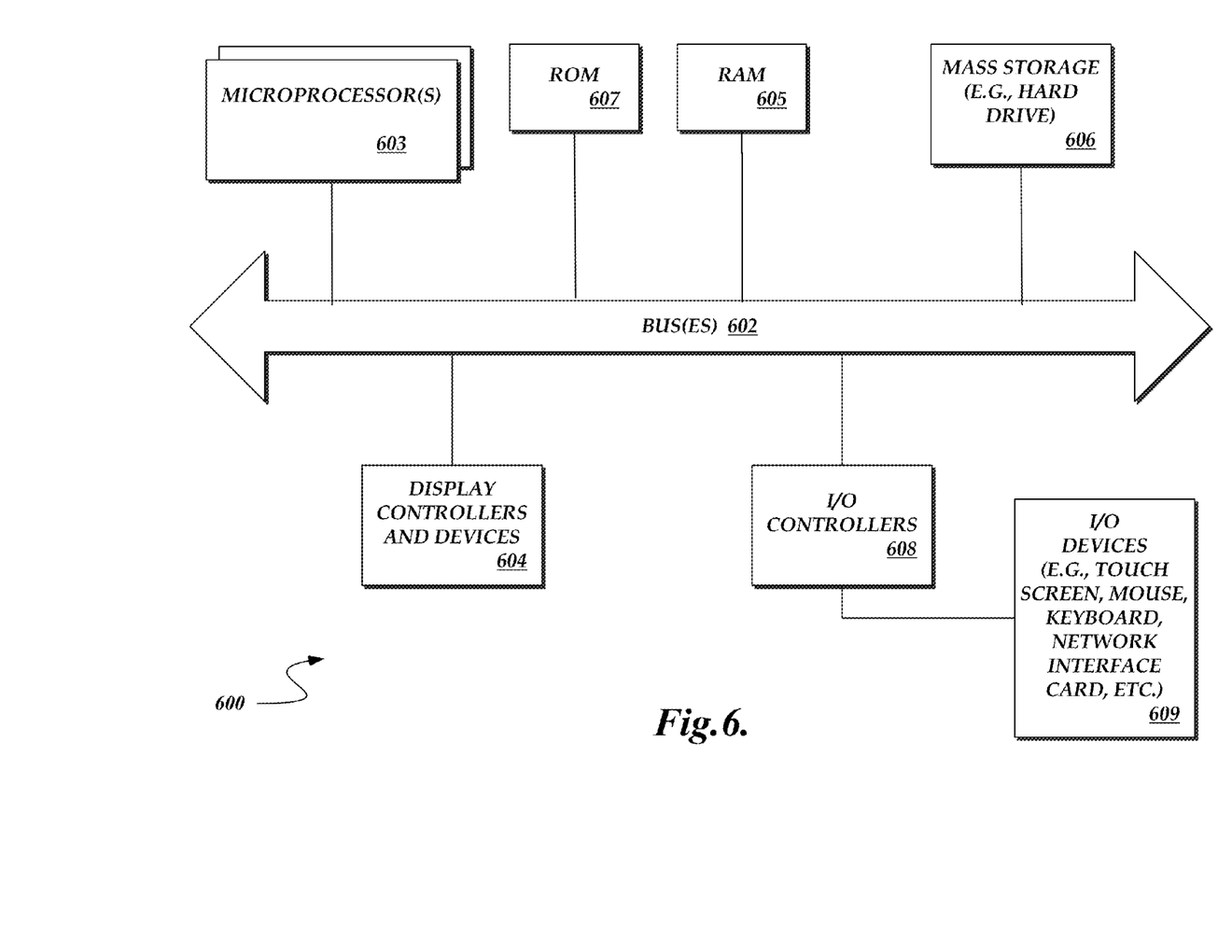
FIG. 6 illustrates an example of a typical computer system which may be used in implementing searching a large data collection in accordance with an embodiment of the invention.

FIG. 6 shows one example of a typical data processing system which may be used with the present invention. Note that while FIG. 6 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 6 may also be used with the present invention. The data processing system of FIG. 6 may be a Macintosh computer from Apple Inc. of Cupertino, Calif.

As shown in FIG. 6, the data processing system 601 includes one or more buses 609 which serve to interconnect the various components of the system. One or more processors 603 are coupled to the one or more buses 609 as is known in the art. Memory 605 may be DRAM or non-volatile RAM or may be flash memory or other types of memory. This memory is coupled to the one or more buses 609 using techniques known in the art.

The data processing system 601 can also include non-volatile memory 607 which may be a hard disk drive or a flash memory or a magnetic optical drive or magnetic memory or an optical drive or other types of memory systems which maintain data even after power is removed from the system. The non-volatile memory 607 and the memory 605 are both coupled to the one or more buses 609 using known interfaces and connection techniques.

A display controller 611 is coupled to the one or more buses 609 in order to receive display data to be displayed on a display device 613 which can display any one of the user interface features or embodiments described herein. The display device 613 can include an integrated touch input to provide a touch screen.

The data processing system 601 can also include one or more input/output (I/O) controllers 615 which provide interfaces for one or more I/O devices, such as one or more mice, touch screens, touch pads, joysticks, and other input devices including those known in the art and output devices (e.g. speakers). The input/output devices 617 are coupled through one or more I/O controllers 615 as is known in the art.

While FIG. 6 shows that the non-volatile memory 607 and the memory 605 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers.

As is known in the art, the one or more buses 609 may include one or more bridges or controllers or adapters to interconnect between various buses. In one embodiment, the I/O controller 615 includes a USB adapter for controlling USB peripherals and can control an Ethernet port or a wireless transceiver or combination of wireless transceivers.

It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 605 or the non-volatile memory 607 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software or to any particular source for the instructions executed by the data processing system.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method as in claim of searching a collection of data, the method comprising:
    generating a bloom filter for each item in a collection of data, the bloom filter having a set of elements, each element in the set of elements representing a fixed length run of characters contained in the item, the set of elements collectively representing every fixed length run of characters contained in the item, wherein generating the bloom filter for each item in a collection of data includes:
        generating each fixed length run of characters contained in the item using a fixed length window positioned over the characters contained in the item,
        shifting the fixed length window over the characters contained in the item one character at time, and
        parsing the characters contained in the fixed length window at a given time into an element in the set of elements;
    receiving a request to search the collection of data for items containing a search term;
    filtering from the collection of data those items for which a fixed length run of characters contained in the search term is not represented in the set of elements of the respective items' bloom filters; and
    searching items not filtered from the collection of data for items containing the search term.

2. The machine-implemented method as in claim 1, further comprising:
    detecting that an item in the collection of data has been updated; and
    generating an updated bloom filter for the updated item, the updated bloom filter having a replacement set of elements, each element in the replacement set of elements representing a run of characters contained in the updated item, the replacement set of elements collectively representing every run of characters contained in the updated item.

3. The machine-implemented method as in claim 1, further comprising:
    detecting that an item in the collection of data has been deleted; and
    deleting the bloom filter for the deleted item.

4. The machine-implemented method as in claim 1, wherein filtering from the collection of data those items for which a fixed length run of characters contained in the search term is not represented in the set of elements of the respective items' bloom filters includes:
    generating a fixed length run of characters contained in the search term using a fixed length window positioned over the characters contained in the search term;
    shifting the fixed length window over the characters contained in the item one character at time;
    parsing the characters contained in the fixed length window at a given time into a series of filter queries;
    determining whether a filter query in the series of filter queries is represented in the set of elements of the respective items' bloom filters; and
    filtering out those items in which any filter query in the series of filter queries is not represented in the set of elements of the respective items' bloom filters.

5. The machine-implemented method as in claim 1, wherein searching items not filtered from the collection of data is performed using a determinative search.

6. A data processing system, the system comprising:
    a memory containing a collection of items, the items containing searchable data;

the memory further containing a bloom filter index for the collection of items, the bloom filter index containing a bloom filter for each item in the collection, the bloom filter having a set of elements, each element in the set of elements representing a fixed length run of characters contained in the item, the set of elements representing every fixed length run of characters contained in an item;

a processor in communication with the memory, the processor to:

receive a query containing a search term;

generate filter queries from the search term contained in the query, each of the filter queries representing one of every fixed length run of characters contained in the search term;

apply the filter queries to the bloom filters of the bloom filter index to identify items that might contain the search term using the bloom filter index wherein the applied filter queries filter from the collection those items that do not contain the search term, the filtered items being those items for which a fixed length run of characters contained in the search term is not represented in the set of elements of the respective items' bloom filters;

search the identified items that might contain the search term for items containing the search term; and return the items containing the search term, if any, responsive to the query.

7. A non-transitory computer readable medium containing instructions that when executed on a data processor search a collection of data, the instructions comprising:

generate a bloom filter for each item in a collection of data, the bloom filter having a set of elements, each element in the set of elements representing a fixed length run of characters contained in the item, the set of elements collectively representing every fixed length run of characters contained in the item, wherein to generate the bloom filter for each item in the collection of data is to:

generate each fixed length run of characters contained in the item using a fixed length window positioned over the characters contained in the item, shift the fixed length window over the characters contained in the item one character at time, and parse the characters contained in the fixed length window at a given time into an element in the set of elements;

receive a request to search the collection of data for items containing a search term;

filter from the collection of data those items for which a fixed length run of characters contained in the search term is not represented in the set of elements of the respective items' bloom filters; and search items not filtered from the collection of data for items containing the search term.

8. The non-transitory computer readable medium as in claim 7, the instructions further comprising:

detect that an item in the collection of data has been updated; and generate an updated bloom filter for the updated item, the updated bloom filter having a replacement set of elements, each element in the replacement set of elements representing a run of characters contained in the updated item, the replacement set of elements collectively representing every run of characters contained in the updated item.

9. The non-transitory computer readable medium as in claim 7, the instructions further comprising:

detect that an item in the collection of data has been deleted; and delete the bloom filter for the deleted item.

10. The non-transitory computer readable medium as in claim 7, wherein the instructions to filter from the collection of data those items for which a fixed length run of characters contained in the search term is not represented in the set of elements of the respective items' bloom filters includes instructions to:

generate a fixed length run of characters contained in the search term using a fixed length window positioned over the characters contained in the search term;

shift the fixed length window over the characters contained in the item one character at time;

parse the characters contained in the fixed length window at a given time into a series of filter queries;

determine whether a filter query in the series of filter queries is represented in the set of elements of the respective items' bloom filters; and filter out those items in which any filter query in the series of filter queries is not represented in the set of elements of the respective items' bloom filters.

11. The non-transitory computer readable medium as in claim 7, wherein the instruction to search items not filtered from the collection of data is performed using a determinative search.

* * * * *